US005730471A

United States Patent [19]

Schulze-Beckinghausen et al.

[11] Patent Number: 5,730,471

[45] Date of Patent: Mar. 24, 1998

[54] APPARATUS FOR GRIPPING A PIPE

[75] Inventors: Joerg-Erich Schulze-Beckinghausen, Garbsen; Bernd-Georg Pietras, Wedemark, both of Germany

[73] Assignee: Weatherford/Lamb, Inc., Houston, Tex.

[21] Appl. No.: 674,184

[22] Filed: Jul. 1, 1996

[30] Foreign Application Priority Data

Dec. 9, 1995 [GB] United Kingdom .................... 9525225

[51] Int. Cl.[6] .......................................... F16L 35/00

[52] U.S. Cl. ............................ 285/18; 285/323; 285/421; 285/912

[58] Field of Search ................................ 285/323, 421, 285/912, 18

[56] References Cited

U.S. PATENT DOCUMENTS

| | | | |
|---|---|---|---|
| 1,736,149 | 11/1929 | Dunmire | 285/912 X |
| 1,796,061 | 3/1931 | Swanson | 285/323 X |
| 2,287,432 | 6/1942 | Kinzbach . | |
| 2,305,637 | 12/1942 | Ricciardi . | |
| 2,819,099 | 1/1958 | Rittle | 285/323 X |
| 3,015,142 | 1/1962 | Rosanoff et al. | 294/86.4 |
| 3,589,742 | 6/1971 | Flick | 279/71 |
| 3,748,702 | 7/1973 | Brown | 24/263 |
| 3,754,780 | 8/1973 | Pogonowski | 285/421 X |
| 3,902,385 | 9/1975 | Haby | 81/57.34 |
| 4,142,739 | 3/1979 | Billingsley | 285/323 X |
| 4,281,535 | 8/1981 | Wesch, Jr. | 73/49.8 |
| 4,334,444 | 6/1982 | Carstensen et al. | 81/57.18 |
| 4,346,629 | 8/1982 | Kinzbach | 81/57.2 |
| 4,478,292 | 10/1984 | Baugh et al. | 173/149 |
| 4,494,425 | 1/1985 | Shewmake, Sr. | 81/57.34 |
| 4,630,690 | 12/1986 | Beasley et al. | 175/57 |
| 4,649,777 | 3/1987 | Buck | 81/57.19 |
| 4,709,599 | 12/1987 | Buck | 81/57.18 |
| 4,712,284 | 12/1987 | Coyle, Sr. et al. | 29/240 |
| 4,726,703 | 2/1988 | Ashley | 403/370 |
| 4,739,681 | 4/1988 | Pietras | 81/57.16 |
| 4,836,064 | 6/1989 | Slator | 81/57.18 |
| 5,042,601 | 8/1991 | Pennison | 175/423 |
| 5,044,232 | 9/1991 | Schulze | 81/57.18 |
| 5,098,134 | 3/1992 | Monckton | 285/421 X |
| 5,167,173 | 12/1992 | Pietras | 81/57.15 |
| 5,221,099 | 6/1993 | Jansch | 279/151 |
| 5,335,756 | 8/1994 | Pennison | 188/67 |
| 5,535,645 | 7/1996 | Pennison | 81/57.33 |

FOREIGN PATENT DOCUMENTS

| | | |
|---|---|---|
| 86116210 | of 1985 | European Pat. Off. . |
| 4333513A1 | of 1993 | Germany . |
| 1197249 | of 1968 | United Kingdom . |
| 2085782 | of 1981 | United Kingdom . |
| 9509657 | of 1995 | United Kingdom . |

OTHER PUBLICATIONS

U.K. Search Report for GB 9509 657.4.

Catalog 1978–79, Joy Petroleum Epuipment, Joy Mfg. Co.

Power Equipment/Tubular Services, One page, Weatherford Int'l, 1994.

Products & Services Catalog, Weatherford, 1994, especially pp. 7–11.

Hydraulic Power Tongs—World Wide, Eckel Mfg. Co., 1993.

Tubing Tongs for Well Servicing and Workover, Weatherford, 1995.

*Primary Examiner*—Dave W. Arola

*Attorney, Agent, or Firm*—Guy McClung

[57] ABSTRACT

An apparatus for gripping a pipe comprises an outer member having at least one inclined inner surface and an inner member having an inclined outer surface, a tubular member having an opening to accommodate said inner member and a threaded part, and a threaded gear engaged with the threaded part of the tubular member. On rotation of the threaded gear the tubular member moves the inner member which co-operates with the outer member so that said inner member moves towards a pipe to be gripped. The apparatus is particularly useful for applying "non-marking" jaws to the outside of tubulars in the oil and gas industry.

34 Claims, 7 Drawing Sheets

APPARATUS FOR GRIPPING A PIPE

FIELD OF THE INVENTION

This invention relates to an apparatus for gripping a pipe.

BACKGROUND OF THE INVENTION

The increasing use of tubulars known as "premium tubulars" in the construction of oil and gas wells has made it desirable to develop jaws which do not or only minimally damage the surface of the tubulars. Such jaws, which are generally referred to as "non-marking jaws" usually comprise an elastomeric material the pipe gripping surface of which may be coated with fine abrasive material to improve grip.

Various means are used for applying such jaws to a pipe. In one known apparatus a multiplicity of hydraulic cylinders are provided which, in use, surround the tubular to be gripped and apply a generally uniform pressure to the jaws.

Whilst this apparatus provides the necessary gripping force it is relatively bulky and use on one of two or more closely adjacent strings is impossible. Furthermore, it relies on a removable hydraulic supply.

Various mechanical apparatus are known for applying conventional jaws to conventional tubulars. Essentially, these mechanical apparatus are designed to press teeth on the jaw into the conventional tubular to obtain the necessary grip. These mechanical arrangements are designed to provide substantial radial force over a small area and are not suitable for use with non-marking jaws which ideally require to be applied with a uniform radially inward pressure.

At least preferred embodiment of the present invention aim to achieve this objective.

SUMMARY OF THE PRESENT INVENTION

According to the present invention there is provided an apparatus for gripping a pipe, which apparatus comprises an outer member having at least one inclined inner surface and an inner member having an inclined outer surface, a tubular member disposed inside said outer member and having an opening to accommodate said inner member and a threaded part, and a drive member operatively engaged with the threaded part of said tubular member, the arrangement being such that, in use, on rotation of said drive member in one sense, said tubular member moves said inner member which co-operate with said outer member so that said inner member moves towards a pipe to be gripped.

It is particularly important with premium tubulars that the joints should be tightened to the correct torque and that the joints should not be loosened when the apparatus releases the jaws. To this end the inclined surfaces are preferably inclined at an angle such that the inner member and the outer member do not lock against one another in use. To achieve this, unless bearings are provided, the inclined surfaces should preferably be inclined at an angle of at least 7°, and more preferably 11° to the longitudinal axis of the pipe.

Preferably the inclined outer surface of the inner member and the inclined inner surface of the outer member are separated by at least one bearing, for example a needle bearing. With such an arrangement the surfaces can be inclined at a much smaller angle to the longitudinal axis of the pipe without locking occurring. An angle of at least 2° and preferably 4° may be satisfactory in such an embodiment.

Advantageously said bearing comprises a strip of linear bearings. Preferably, a spring is provided to bias said linear bearings towards their uppermost position in use.

Preferably said inner member is slidably attached to said outer member.

Advantageously, the apparatus is capable of being opened to receive a pipe.

Advantageously, said outer member comprises two halves which are capable of being opened to receive the pipe.

Preferably, each end of each half is provided with at least one claw, the arrangement being such that the claws of one half can interengage with the claws of the other half to maintain said halves together.

Advantageously, said apparatus further comprises an apparatus opening device arranged to raise one half of said outer member relative to the other to enable said halves to be separated.

Preferably, said halves are mounted on a common pivot pin so that said halves can be pivoted towards or away from one another.

Advantageously, said tubular member also comprises two halves.

Preferably, said apparatus includes a motor for rotating said drive member.

Advantageously, said motor is provided with a pinion, said drive member is threaded, and said pinion is in permanent engagement with said drive member. This arrangement enables the drive member to be rotated independently of actuation of the rotary and the gripping force applied to the pipe to be adjusted quickly and, if necessary, even when the rotary is in motion.

Preferably, the inner member is provided with an elastomeric gripping member the surface of which is preferably provided with an abrasive or an embedded material to enhance the gripping ability thereof.

Advantageously, said outer member is provided with a plurality of rollers and said drive member is supported by said rollers.

The present invention also provides a tong provided with an apparatus in accordance with the present invention.

For a better understanding of the present invention reference will now be made, by way of example, to the accompanying drawings, in which:

DETAILED DESCRIPTION OF THE PREFERRED EMBODIMENT

Figure 1:
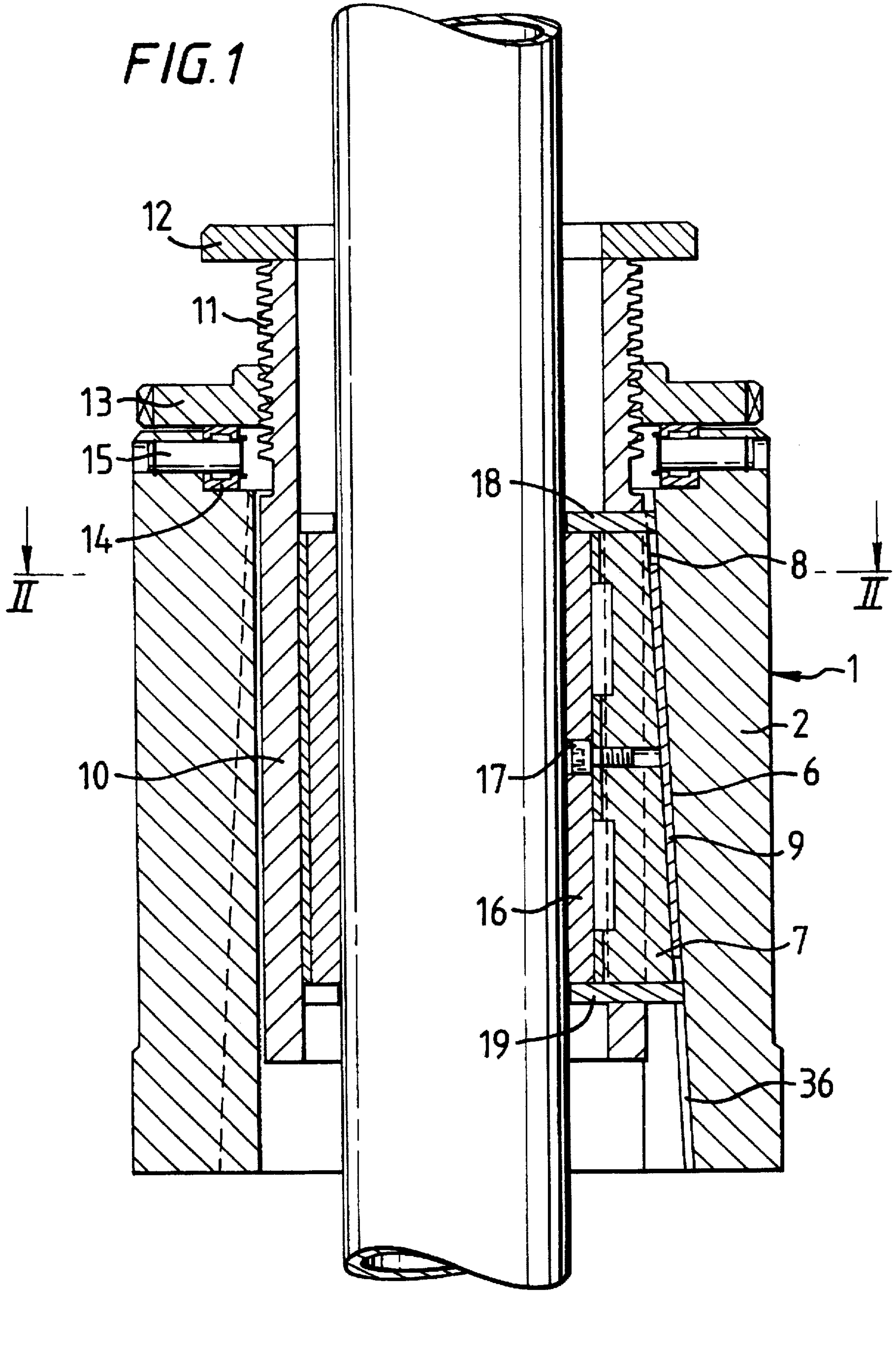
FIG. 1 is a vertical section through one embodiment of an apparatus in accordance with the invention gripping a pipe for rotation in either sense, the section being taken on line I—I of FIG. 2.

Referring to FIG. 1 of the drawings there is shown an apparatus which is generally identified by reference numeral 1.

Figure 2:
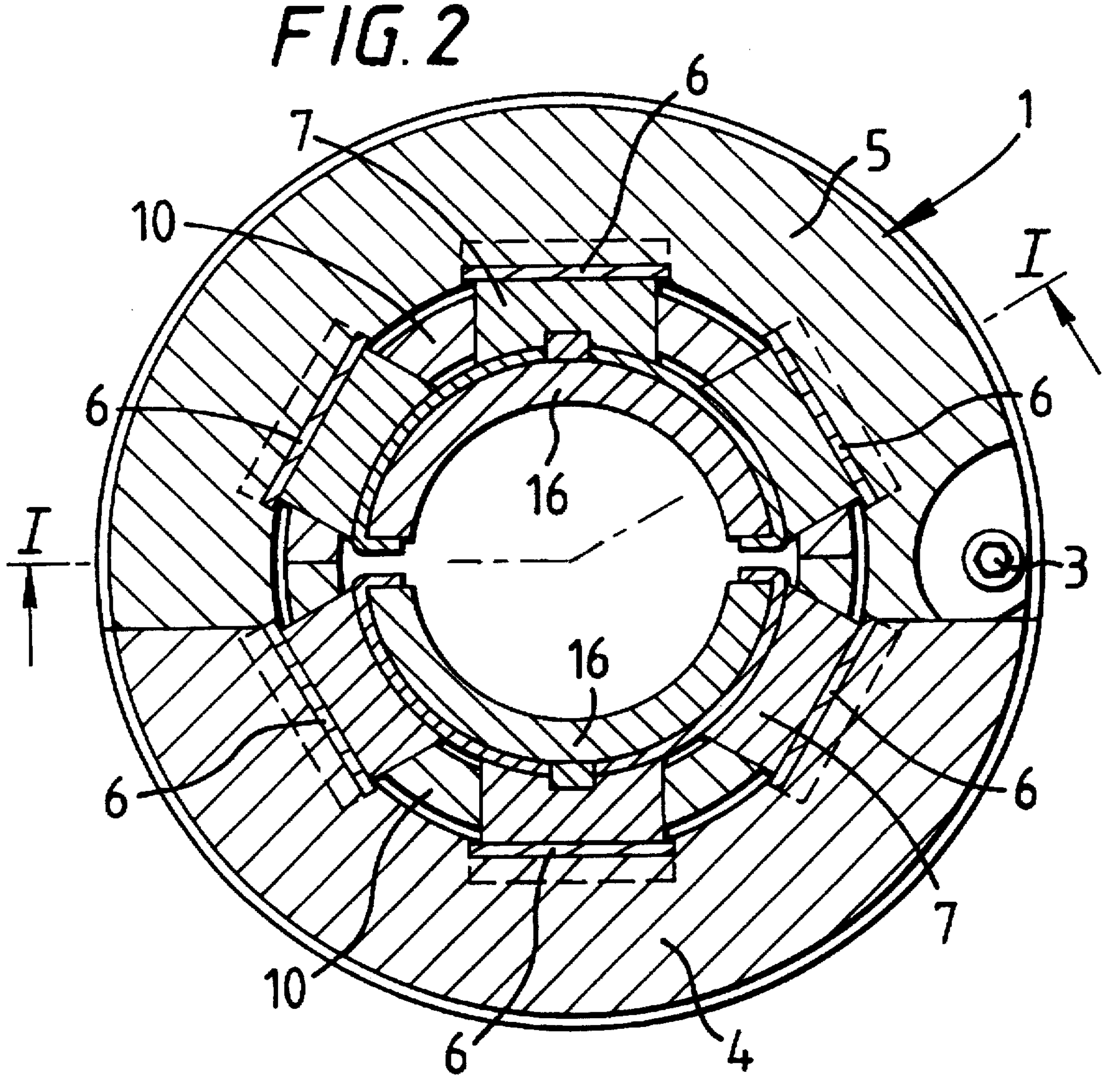
FIG. 2 is a horizontal cross-section of the apparatus when taken on line II—II of FIG. 1.
Figure 3:
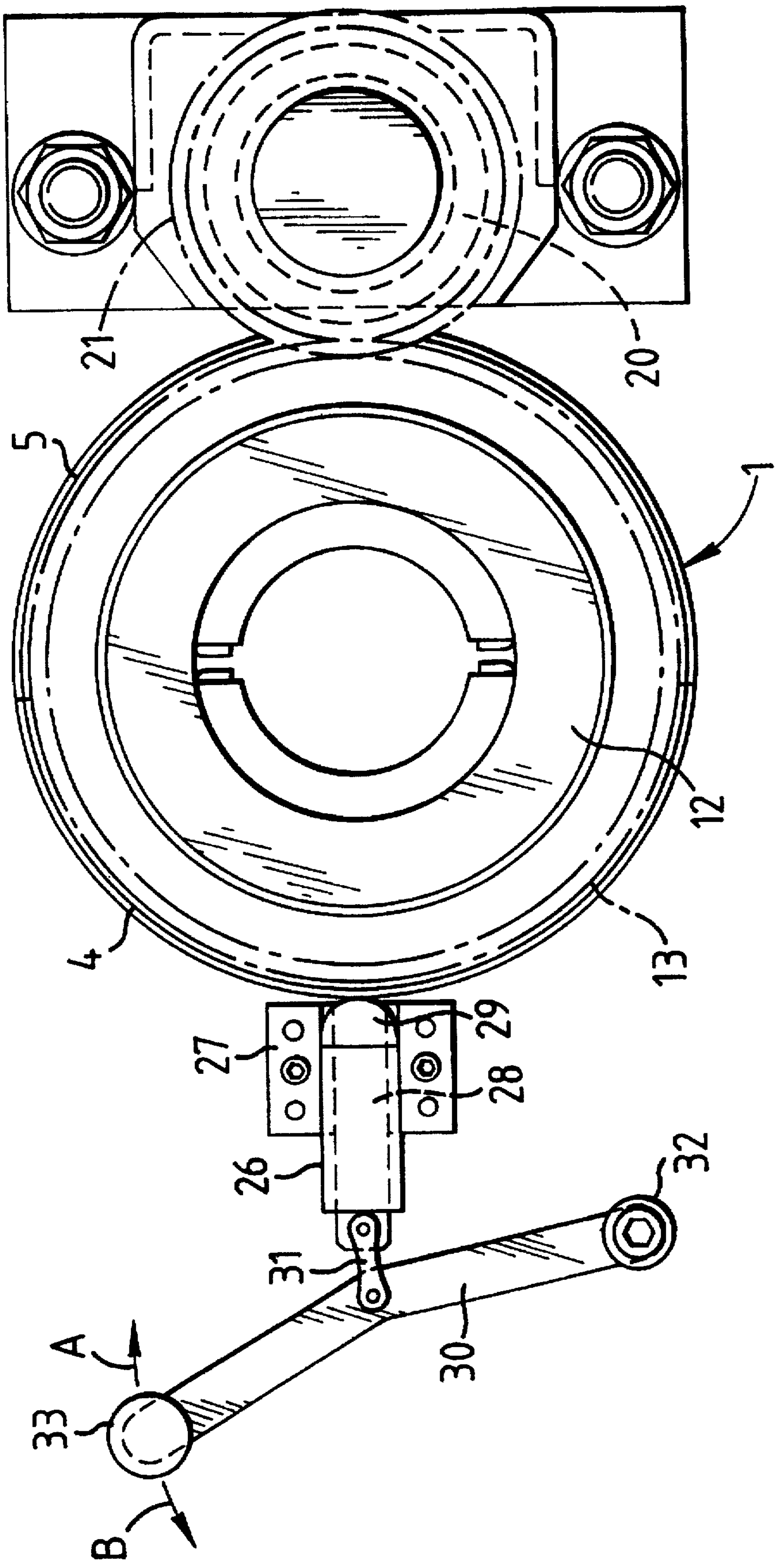
FIG. 3 is a top plan view of the apparatus but also showing a drive-motor to activate the apparatus and an apparatus opening device to enable the apparatus to be opened.

The apparatus 1 comprises an outer member 2 which, as shown in FIG. 2, comprises two halves 4 and 5 which pivotally mounted on an axle 3.

As shown in FIG. 2 the outer member 2 is provided with six inclined inner surfaces 6.

Six inner members 7 each having an inclined outer surface 8 are disposed with their outer surfaces 8 adjacent a respective inclined inner surface 6 of the outer member 2 and separated therefrom by a strip 9 of linear bearings.

A tubular member 10 is disposed inside the outer member 2. The upper part of the tubular member 10 is provided with a threaded part 11 while the lower part is provided with six windows each of which accommodates a respective one of the inner members 7. The top of the tubular member 10 is provided with an end cap 12.

A drive member in the form of a threaded gear 13 is threadedly connected to the threaded part 11 of the tubular member 10 and rests on a plurality of rollers 14 which are freely rotatable on shafts 15 mounted in the outer member 2.

A flexible jaw 16 is bolted to each inner member 7 by a bolt 17.

The upper and lower ends of each inner member 7 are secured to guide plates 18 and 19 respectively. The circumferential edges of the radially outer portion of each guide plate 18, 19 are each provided with a circumferentially outwardly extending leg which projects in a groove 36 cut in the outer member 2. This arrangement enables the inner member 7 to move along the outer member 2 whilst preventing the inner member 7 falling radially inwardly.

It will be appreciated that when threaded gear 13 is rotated in one sense the tubular member 10 will rise. This raises the inner members 7 which move radially inwardly as they rise. Similarly, when the threaded gear 13 is rotated in the opposite sense the tubular member will fall. This lowers the inner member 7 which move radially outwardly as they fall.

Figure 4:
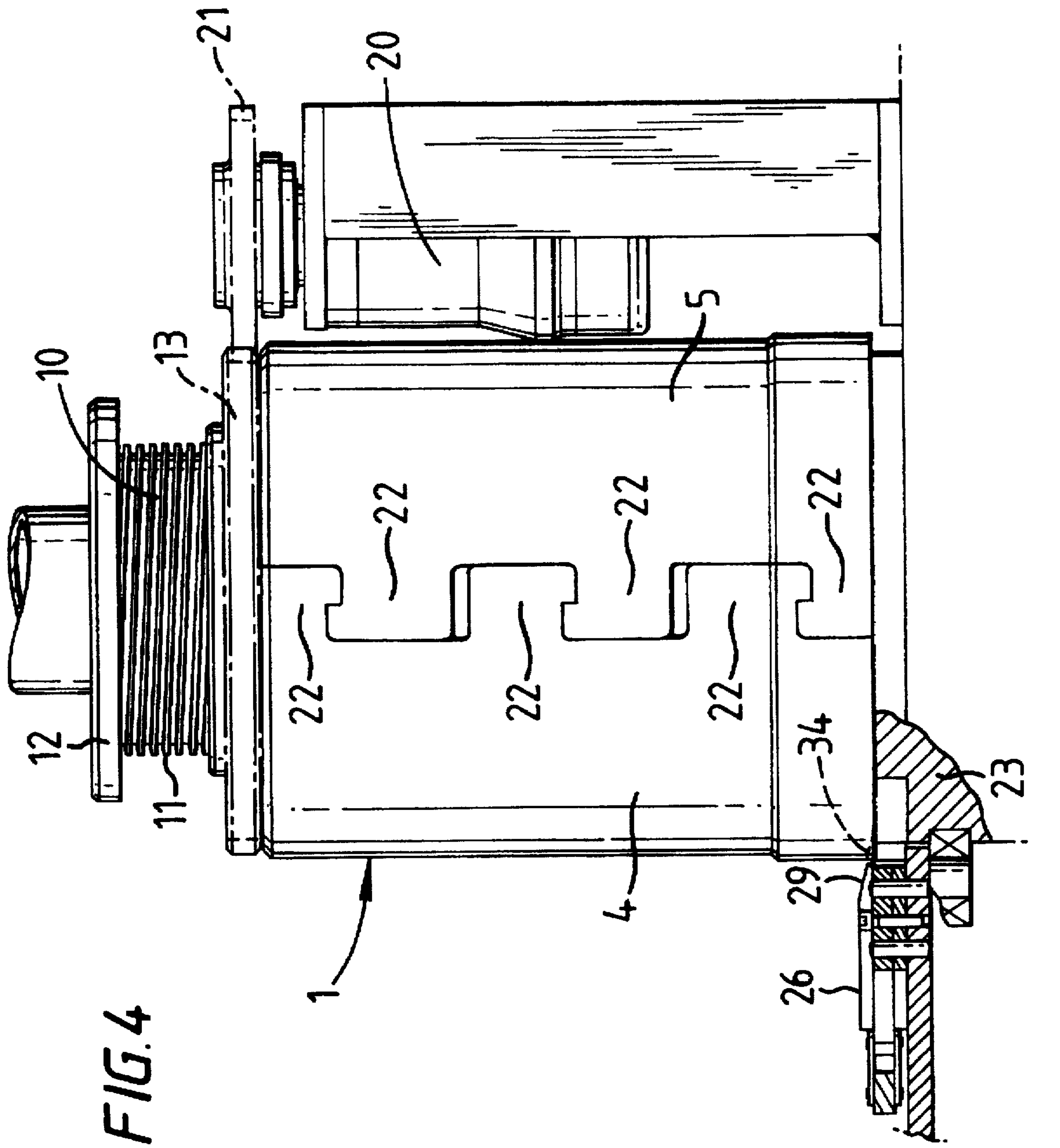
FIG. 4 is a side view, partly in elevation and partly in section, of the elements shown in FIG. 3.

In order to rotate the threaded gear 13 a hydraulic motor 20 is provided (FIG. 4). The hydraulic motor 20 has a pinion 21 which meshes with the teeth on the circumference of the threaded gear 13.

Figure 5:
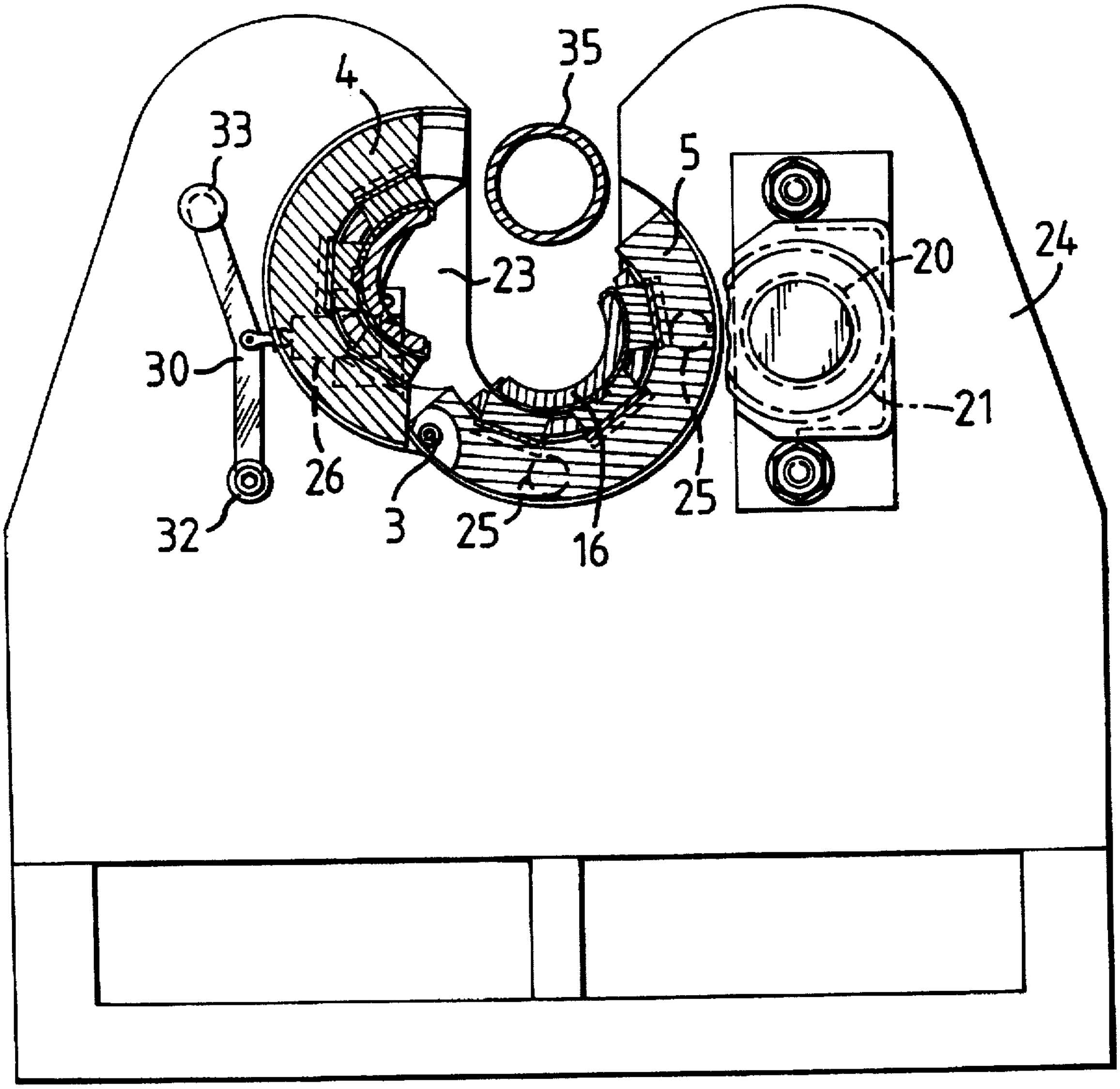
FIG. 5 is a view similar to FIG. 3 but showing the elements mounted on a tong and the apparatus open to receive a pipe.

Turning now to the general construction of the outer member 2, each end of each half 4,5 is provided with three claws 22 which, as shown in FIG. 4, co-operate to hold the halves together. If the half 4 is lifted relative to the half 5 the claws 22 disengage and the half 4 can be pivoted about axle 3 to open the apparatus to allow the sideways entry of a pipe (FIG. 5). It should be particularly noted that both ends of each half 4,5 is provided with claws 22.

In use, the half 5 is bolted to the top of a rotary 23 of a power tong 24 by bolts 25 (FIG. 5). An apparatus opening device 26 is mounted on the power tong 24 alongside the half 4.

The apparatus opening device 26 comprises a guide 27 which is bolted to the power tong 24 and accommodates a slider 28 which has a rounded and tapered tip 29 and is connected to an operating handle 30 by a link 31. One end 32 of the operating handle 30 is pivotally mounted to the power tong 24 while the other end 33 is provided with a knob 33.

As can be seen in FIG. 4, the bottom of the half 4 is provided with a recess 34 which is shaped to accommodate the rounded and tapered top 29 of the slider 28. When the recess 30 is aligned with the slider 28 an operator can urge the knob 33 in the direction of arrow "A". The rounded and tapered top 29 of the slider 28 enters the recess 34. Further movement of the knob 33 in direction "A" raises the half 4 to disengage the claws 22. The slider 28 also enters a recess on the rotary 23 to prevent it rotating. The half 5 rests on the top of the slider 28 and may be pivoted about axle 3 until the apparatus 1 reaches the open position shown in FIG. 5.

The operation of the apparatus will now be described.

At the commencement of an operation the rotary is moved into its pipe receiving position as shown in FIG. 5. In this position the recess 34 is aligned with the slider 28. The knob 33 is then moved in the direction of arrow "A" to raise the half 4 which is then pivoted to the open position shown in FIG. 5.

The power tong 24 is then advanced to accommodate a pipe 35 which is shown entering the rotary 23 in FIG. 5.

When the power tong 23 is fully advanced the half 4 is moved in the direction of arrow "A" until the claws 22 are vertically aligned. Knob 33 is then moved in the direction of arrow "B" whilst movement of half 4 with the slider 28 is restrained by hand. This lowers the half 4 with its claws 22 engaging the claws 22 of half 5.

Hydraulic fluid is then applied to hydraulic motor 20 to rotate pinion 21 and threaded gear 13. This raises tubular member 10 which, via its windows, raises inner members 7 which move radially inwardly as they rise. When the required torque has been reached, which is determined by a pressure relief valve in the hydraulic supply to hydraulic motor 20, both the supply and return hydraulic pipes to the hydraulic motor 20 are coupled to the reservoir. The rotary 23 is then rotated in the usual manner. It should be noted that since both the supply and return pipes to the hydraulic motor 20 are coupled to the reservoir pinion 21 rotates freely offering minimal resistance to rotation of the threaded gear 13.

After the pipe has been tightened to the desired torque hydraulic fluid is pumped to hydraulic motor 20 to rotate the pinion 21 in the opposite direction. The pinion 21 rotates the threaded gear 13 which, in turn lowers the tubular member 11.

Figure 6:
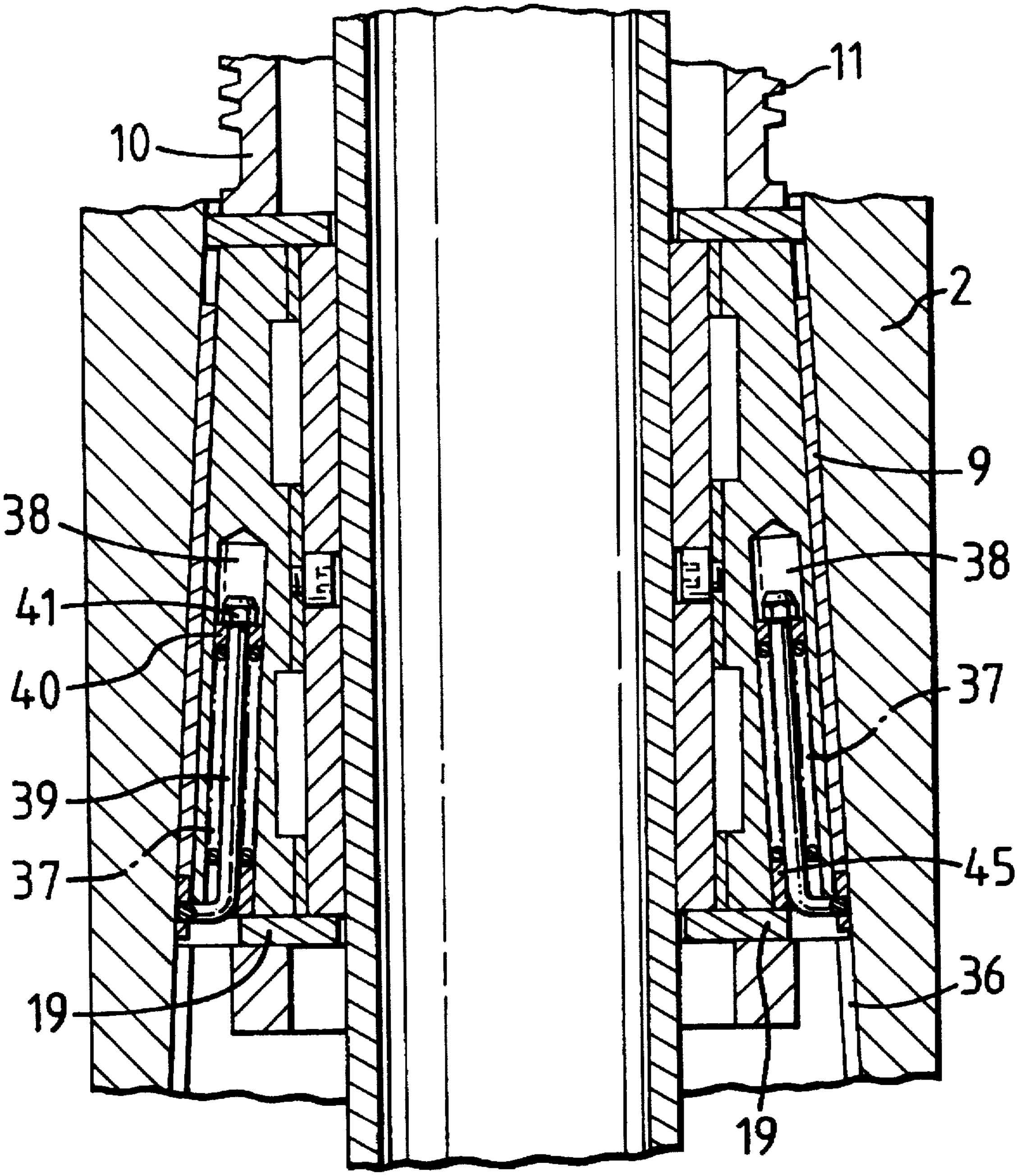
FIG. 6 is a vertical cross-section through part of the apparatus showing a detail thereof.

As indicated previously, in order to inhibit locking between the inner members 7 and the outer member 1 a strip of linear bearings 9 is disposed between each inclined inner surface 6 of the outer member 2 and the inclined outer surface 8 of the associated inner member 7. The strip of linear bearings 9 comprises a thin strip of material in which are mounted a multiplicity of individual roller bearings. The strip of linear bearings 9 allows the inner member 7 to slide freely relative to the outer member 2 and helps inhibit locking of the inner member 7 and the outer member 2. The inclined inner surfaces 6 of the outer member 2 and the inclined outer surfaces 8 of the associated inner members 7 are each inclined at an angle of 3° with respect to the longitudinal axis of the pipe 35. As shown in FIG. 6, each strip of linear bearings 9 is biased upwardly by a spring 37 which is accommodated in a bore 38 in each inner member 7. Each spring 37 acts between a short cylindrical collar 45 which rests on guide plate 19 and has a longitudinally extending slot therealong which accommodates a lifting bar $9, one end of which extends beneath the strip of linear bearings 9 and the other end of which is urged upwardly by spring 37 via a washer 40 and a nut 41.

Once the pipe 35 has been released the rotary 23 is rotated until the recess 34 is aligned with the slider 28. Knob 33 is then moved in the direction of arrow "A" to allow the slider 28 to enter the recess 34 and raise the half 4. The half 4 is then opened.

The power tong 24 is then withdrawn to complete the operation.

It will be noted that the gripping force which is applied by the flexible jaw 16 to the pipe 35 is independent of the torque applied by the rotary 23. This is because the hydraulic motor 20 can be actuated independently of the rotary 23. Since the pinion 21 of the hydraulic motor 20 is in permanent engagement with the threaded gear 13 the gripping forge applied to the pipe 35 can be quickly adjusted, even when the rotary 23 is in motion. However, it is recommended that the rotary 23 be stopped while the gripping force is adjusted so that the required gripping force can be accurately applied.

The inner surface of the flexible jaw 16 is provided with abrasive material to increase the grip of the flexible jaw 16. As an alternative the flexible jaw 16 could have material embedded therein for the same purpose.

Figure 7:
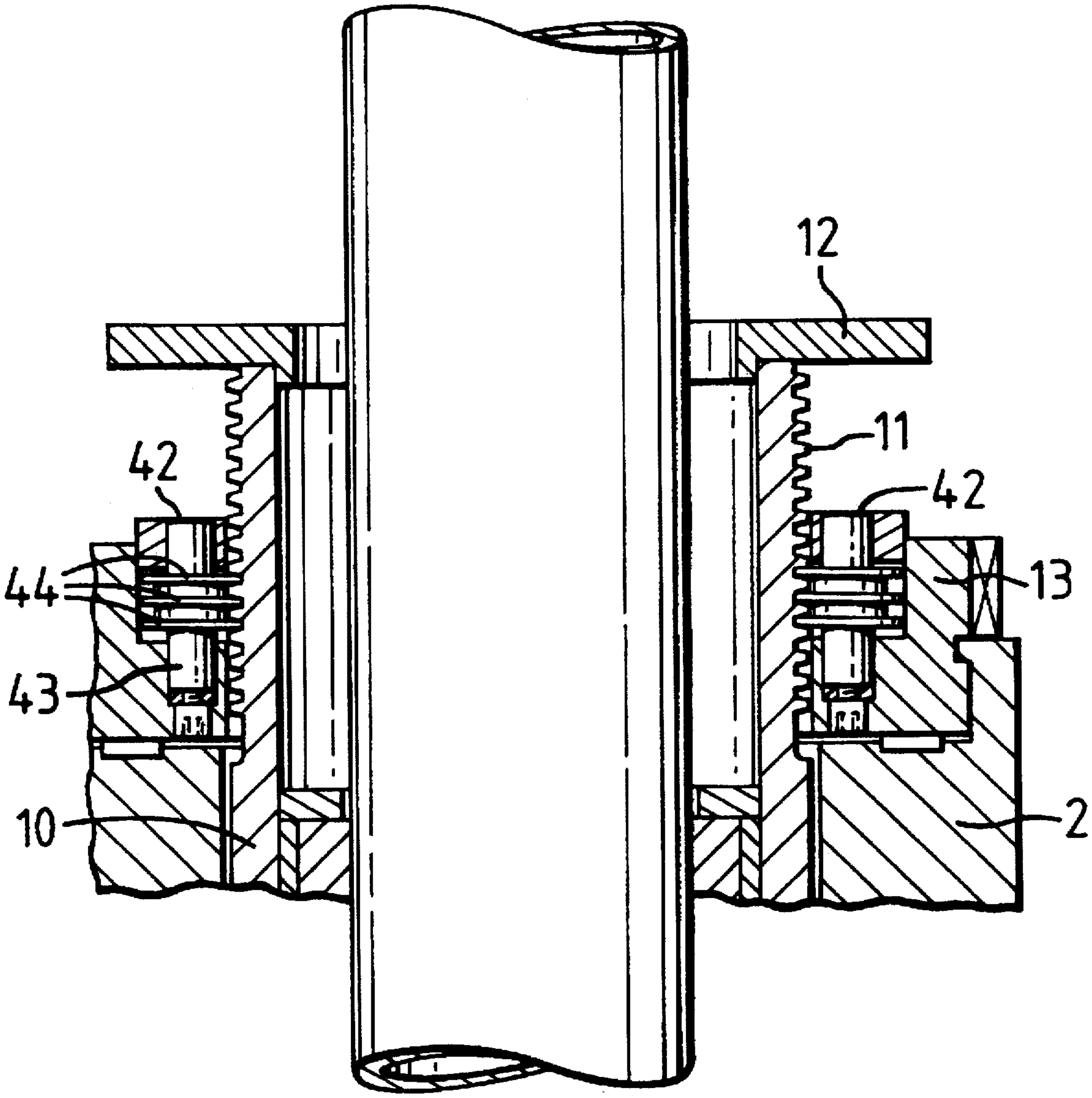
FIG. 7 shows an alternative detail of another part of the apparatus.

FIG. 7 shows an alternative arrangement in which the threads of threaded gear 13 are formed by a plurality of member 42 which are disposed circumjacent the threaded part 11 of the tubular member 10.

Each member 42 comprises a shaft 43 which is rotatably mounted in the threaded gear 13 and is provided with three disks 44 which engage with the threaded part 11 of the tubular member 10.

What is claimed is:

1. An apparatus for gripping a pipe, which apparatus comprises an outer member having at least one inclined inner surface and an inner member having an inclined outer surface, a tubular member with a first part thereof movably disposed inside said outer member and having a window which accommodates said inner member, the tubular member having a threaded part outside the outer member, and a drive member outside the outer member and operatively engaged with the threaded part of said tubular member and said outer member, so that when said drive member is rotated in one sense, said tubular member moves said inner member within said window and said inner member cooperates with said outer member so that said inner member moves towards a pipe to be gripped.

2. An apparatus as claimed in claim 1 wherein the inclined surfaces are inclined at an angle such that the inner member and the outer member do not lock against one another.

3. An apparatus as claimed in claim 2 wherein said surfaces are inclined at an angle of at least 7° to the longitudinal axis of the pipe.

4. An apparatus as claimed in claim 7 wherein the inner member and outer member are separated by at least one beating.

5. An apparatus as claimed in claim 4 wherein the surfaces are inclined at an angle of 4° to the longitudinal axis of the pipe.

6. An apparatus as claimed in claim 4 wherein said at least one bearing comprises a strip of linear bearings.

7. An apparatus as claimed in claim 6 including a spring contacting said strip and biasing said strip upwardly.

8. An apparatus as claimed in claim 5 wherein said at least one bearing comprises a strip of linear beatings.

9. An apparatus as claim in claim 8 including a spring contacting said strip and biasing said strip upwardly.

10. An Apparatus as claimed in claim 1 wherein said inner member is slidable with respect to said outer member.

11. An apparatus as claimed in claim 1 wherein the outer member comprises two halves movable with respect to each other and openable to receive the pipe.

12. An apparatus as claimed in claim 11 wherein each end of each half is provided with at least one claw, the at least one claw of one half interengageable with the at least one claw of the other half to maintain said halves together.

13. An apparatus as claimed in claim 11 wherein the halves of the outer member are movable with respect to each other and the apparatus including an apparatus opening device in contact with and arranged to raise one half of the outer member relative to the other to enable said halves to be separated.

14. An apparatus as claimed in claim 12 wherein the halves of the outer member are movable with respect to each other and the apparatus including an apparatus opening device in contact with and arranged to raise one half of the outer member relative to the other to enable said halves to be separated.

15. An apparatus as claimed in claim 11 wherein said halves are mounted on a common pivot pin and said halves are pivotable towards or away from one another.

16. An apparatus as claimed in claim 11 wherein said tubular member comprises two halves.

17. An apparatus as claimed in claim 1 including a motor for rotating said drive member.

18. An apparatus as claimed in claim 17 wherein said motor is provided with a pinion, said drive member is threaded, and said pinion is in permanent engagement with said drive member.

19. An apparatus as claimed in claim 1 wherein said inner member has attached thereto an elastomeric gripping member.

20. An apparatus as claimed in claim 19 wherein the surface of said elastomeric gripping member is provided with an abrasive.

21. An apparatus as claimed in claim 19 wherein said elastomeric gripping member includes material embedded therein to enhance the gripping ability of said elastomeric gripping member.

22. An apparatus as claimed in claim 1 wherein said outer member is provided with a plurality of rollers and said drive member is supported by said rollers.

23. An apparatus for gripping a pipe, which apparatus comprises an outer member having at least one inclined inner surface and an inner member having an inclined outer surface, a tubular member with a first part thereof movably disposed inside said outer member and having a window which accommodates said inner member, the tubular member having a threaded part outside the outer member, and a drive member outside the outer member and operatively engaged with the threaded part of said tubular member and said outer member, so that when said drive member is rotated in one sense, said tubular member moves said inner member within said window and said inner member cooperates with said outer member so that said inner member moves towards a pipe to be gripped, wherein the inner member and outer member are separated by a strip of linear bearings and the inclined surfaces are inclined at an angle such that the inner member and the outer member do not lock against one another, wherein said inner member is slidable with respect to said outer member, and wherein said outer member comprises two halves movable with respect to each other and openable to receive the pipe.

24. An apparatus as claimed in claim 23 including a spring contacting said strip and biasing said strip upwardly.

25. An apparatus as claimed in claim 23 wherein each end of each half is provided with at least one claw, the at least one claw of one half interengageable with the at least one claw of the other half to maintain said halves together.

26. An apparatus as claimed in claim 25 wherein the halves of the outer member are movable with respect to each other and the apparatus including an apparatus opening device in contact with and arranged to raise one half of the outer member relative to the other to enable said halves to be separated.

27. An apparatus as claimed in claim 26 wherein said halves are mounted on a common pivot pin and said halves are pivotable towards or away from one another.

28. An apparatus as claimed in claim 23 wherein said tubular member comprises two halves.

29. An apparatus as claimed in claim 23 including a motor for rotating said drive member.

30. An apparatus as claimed in claim 29 wherein said motor is provided with a pinion, said drive member is threaded, and said pinion is in permanent engagement with said drive member.

31. An apparatus as claimed in claim 23 wherein said inner member has attached thereto an elastomeric gripping member.

32. An apparatus as claimed in claim 31 wherein the surface of said elastomeric gripping member is provided with an abrasive.

33. An apparatus as claimed in claim 32 wherein said elastomeric gripping member includes material embedded therein to enhance the gripping ability of said elastomeric gripping member.

34. An apparatus as claimed in claim 23 wherein a plurality of rollers are mounted on said outer member and said drive member is supported by said rollers.

* * * * *